(12) United States Patent
Peterson

(10) Patent No.: US 6,301,262 B1
(45) Date of Patent: Oct. 9, 2001

(54) SYSTEM AND METHOD FOR DETERMINING MESSAGE TRANSMISSION TIME FOR ESTABLISHING A COMMUNICATIONS LINK ON A TIME DOMAIN MULTIPLE ACCESS NETWORK

(76) Inventor: Edward Douglas Peterson, 1435 Monument Hill Rd., El Cajon, CA (US) 92020

( * ) Notice: Subject to any disclaimer, the term of this patent is extended or adjusted under 35 U.S.C. 154(b) by 0 days.

(21) Appl. No.: 09/087,171

(22) Filed: May 29, 1998

(51) Int. Cl.[7] .................................................. H04J 3/16
(52) U.S. Cl. .......................... 370/458; 370/230; 370/329; 370/341; 370/395; 370/468
(58) Field of Search .................................. 370/314, 321, 370/336, 337, 341, 347, 348, 395, 401, 402, 458, 468, 475, 229, 230, 329, 397, 459, 442

(56) References Cited

U.S. PATENT DOCUMENTS

| | | | |
|---|---|---|---|
| 5,742,594 | * | 4/1998 | Natarajan .............................. 370/336 |
| 6,130,886 | * | 10/2000 | Ketseoglou et al. ................. 370/347 |
| 6,175,860 | * | 1/2001 | Gaucher ................................ 455/3.3 |

* cited by examiner

Primary Examiner—Douglas Olms
Assistant Examiner—Shick Hom
(74) Attorney, Agent, or Firm—Harvey Fendelman; Peter A. Lipovsky; Michael A. Kagan

(57) ABSTRACT

A computer implemented method is described for determining message transmission time in a time division multiple access communications network. The method includes the steps of: a) receiving a request message having one of a set of communications type categories from a first communications resource, a source address which identifies the first communications resource, and a destination address which identifies a second communications resource; b) directing the request message to a message request processor for processing a message request having the communication type category; c) determining if a communications link is connectable between the first and second communication resources; d) generating a first message type if the determination in step (c) is that no communications link is connectable between the first and second communication resources; e) searching for assignable time slots within a periodic time frame comprising multiple time slots for transmitting a message so that the second communications resource is receptive to receiving the message during one of the time slots if the determination in step (d) is that a communications link is connectable between the first and second communications resources; f) generating a second message type if any assignable time slots are identified in step (e); and g) returning to step (a) if no assignable time slots are identified in step (e).

10 Claims, 6 Drawing Sheets

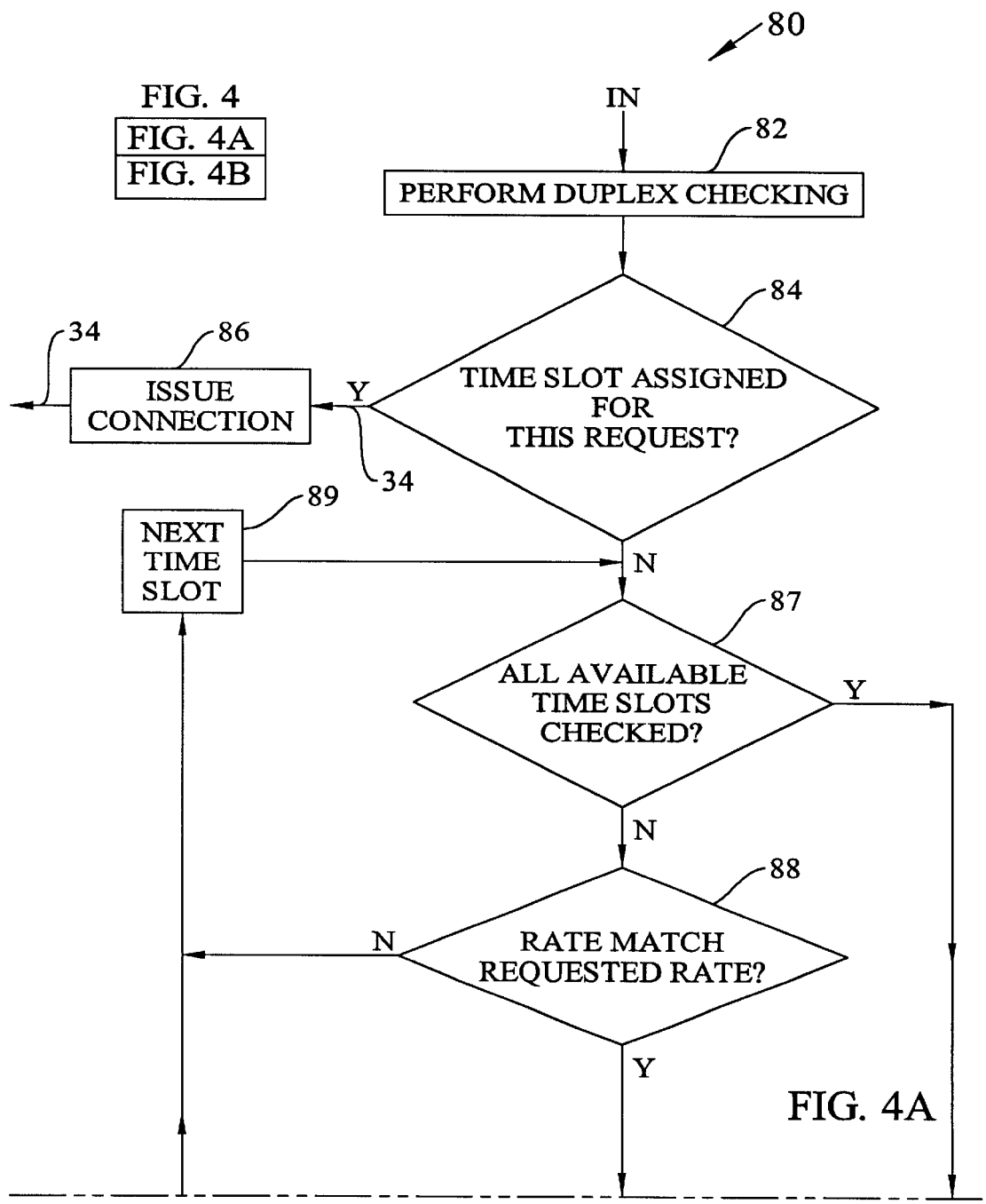

SYSTEM AND METHOD FOR DETERMINING MESSAGE TRANSMISSION TIME FOR ESTABLISHING A COMMUNICATIONS LINK ON A TIME DOMAIN MULTIPLE ACCESS NETWORK

REFERENCE TO COMPUTER PROGRAM LISTING APPENDIX

Appendix 1 is a computer program listing which is submitted on one compact disc that is referenced in the following specification and incorporated herein by reference. Appendix 1 comprises a single file, SACAUTO.C, which was created in April 1994 and includes 278,338 bytes.

BACKGROUND OF THE INVENTION

The present invention generally relates to the field of communications networks, and more particularly to a method for facilitating communications between resources on a multichannel network by determining appropriate time slots and channels on which to transmit a message so that it will arrive at its destinations at a time when it may be received.

Time Domain Multiple Access (TDMA) communications systems allow multiple users to communicate through a Demand Assigned Multiple Access (DAMA) multiplexer over a network using a common communications path. A DAMA multiplexer is TDMA connection between a user baseband device (Teletype, Phone, FAX, etc.) and a communication system such as a local area network (LAN) or satellite relay system. A DAMA multiplexer retains send and receive data in a holding buffer until the specified time slot for communications occurs. The data then is burst in or out of the buffer at a much higher rate to facilitate a perceived constant communications path. Messages are sent during specific time slots which comprise a periodic time frame, or TDMA field.

The TDMA field of each time frame includes a timing mark to identify the beginning of each time frame and is followed by multiple time slots. In the past, DAMA multiplexers allowed both distributed (DC) and automatic (AC) control modes.

In the DC mode, users simply connect themselves to the communications fields (time slots) they are interested in. However, there are problems associated with this relatively unstructured method of communications. For example, unauthorized users could connect to private communications, constant key offenders jammed the time slots, and no policing of control and order existed. A request for a new circuit could take weeks to be assigned. Most users would leave circuits connected to a time slot even though they were not being used. These shortcomings resulted in the inefficient use of communications channels, particularly of the type used in UHF satellite communications systems.

AC mode provides a single point of control like a telephone system. In the AC mode, all communications must request connection to a specific group or user terminal(s) identified by address(es). This allows more flexibility for creative connections including communications amongst various different channels, and device matching (phone connected to another phone) for preventing jamming or interference from unknown sources. In that system, connections are made in less than five seconds if time slots are available. However, when operated in the original AC mode, the DAMA controller was a person-intensive system requiring the controller to be manned 24 hours a day, and was prone to failure. The AC mode DAMA channel controller was a manual system requiring a human to make intelligent decisions as to where to place requesting users on a time slot. Many requests went unconnected. Therefore, the DC mode remained as the fall back operational mode until a better DAMA Channel Controller could be built.

Determining the time in which to transmit a message presented another significant problem because the distances between communications resources on a network result in propagation delays for the messages between the time they are transmitted until they are received. Thus, even if a time slot was found in which a message could be transmitted, by the time the message reached its intended target receiver, the current time slot at the resource may already be allocated for some other message so that the target receiver would be unable to detect the first message.

Therefore, a need exists for an automatic system and method for determining the time slot in which a message may be sent so that the message reaches its intended destination at a time when it may be received.

SUMMARY OF THE INVENTION

The present invention provides a system which employs a computer implemented method for determining a message transmission time for establishing a communications link on a time domain multiple access network. The method comprises the steps of: a) receiving a request message having one of a set of communications type categories from a first communications resource, a source address which identifies the first communications resource, and a destination address which identifies a second communications resource; b) directing the request message to a message request processor for processing a message request having the communication type category; c) determining if a communications link is connectable between the first and second communication resources; d) generating a first message type if the determination in step (c) is that no communications link is connectable between the first and second communication resources; e) searching for assignable time slots within a periodic time frame comprising multiple time slots for transmitting a message so that the second communications resource is receptive to receiving the message during one of the time slots if the determination in step (d) is that a communications link is connectable between the first and second communications resources; f) generating a second message type if any assignable time slots are identified in step (e); and g) returning to step (a) if no assignable time slots are identified in step (e).

The scope of the invention further includes a time domain multiple access communication network system for determining a time slot within a periodic time frame in which to transmit a message from a first communication resource so that it will be received by a second communication resource. The system comprises multiple communication resource sets which each include at least one communication resource; a communication terminal connected to each communication resource set; a communication router operably connected to each communication terminal; and a control processor for determining a time slot within a periodic time frame in which one of the terminals transmits a message received from one of the communication resources connected to the one terminal so that the message will be received by designated communication resources at a time when the designated communication resources are disposed to receive the message. The control processor implements the method steps detailed herein above.

The invention may also be characterized as a computer readable medium which embodies a computer program executable by a computer that performs the above-described method steps.

An important advantage of the invention is that it provides a quick connect time from the time a message request is received to the time that a time slot assignment for transmitting the message is determined so that the intended receiving resource on a time domain multiple access network is disposed to receive the message.

Another important advantage of the invention is that it provides automatic connections between resources on a time domain multiple access network.

Yet another advantage of the invention is that it more efficiently allocates time slot assignments for periods appropriate for the transmit time of the message.

These and other advantages of the invention will become more apparent upon review of the accompanying drawings and specification, including the claims.

BRIEF DESCRIPTION OF THE DRAWINGS

Throughout the several view, like elements are referenced using like references.

DESCRIPTION OF THE PREFERRED EMBODIMENT

Figure 1:
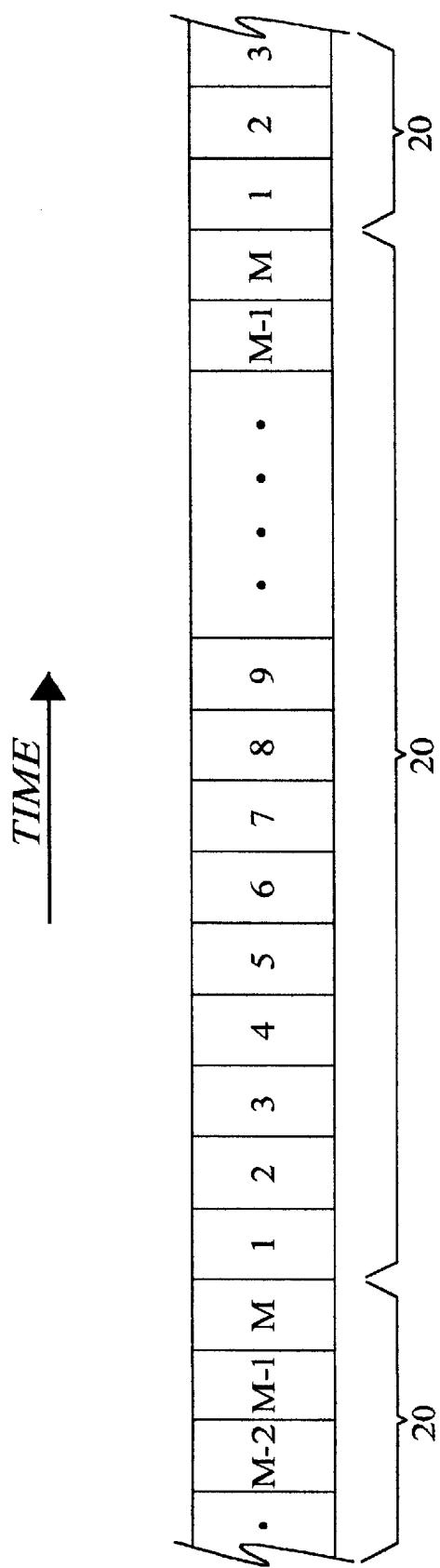
FIG. 1 illustrates a series of periodic time frames divided into time slots.

The present invention is directed to a system and method for determining whether a communications link can be established between two resources of a communications network that employs time domain multiple access (TDMA) technology. In a TDMA network, messages are transmitted in predetermined time slots within a series of periodic time frames, where each time frame is divided into a predetermined number of time slots. An example of a periodic series of time frames 20 each divided into an m number of time slots 1, 2, 3, 4, . . . (m–1), and m is shown in FIG. 1.

Figure 2:
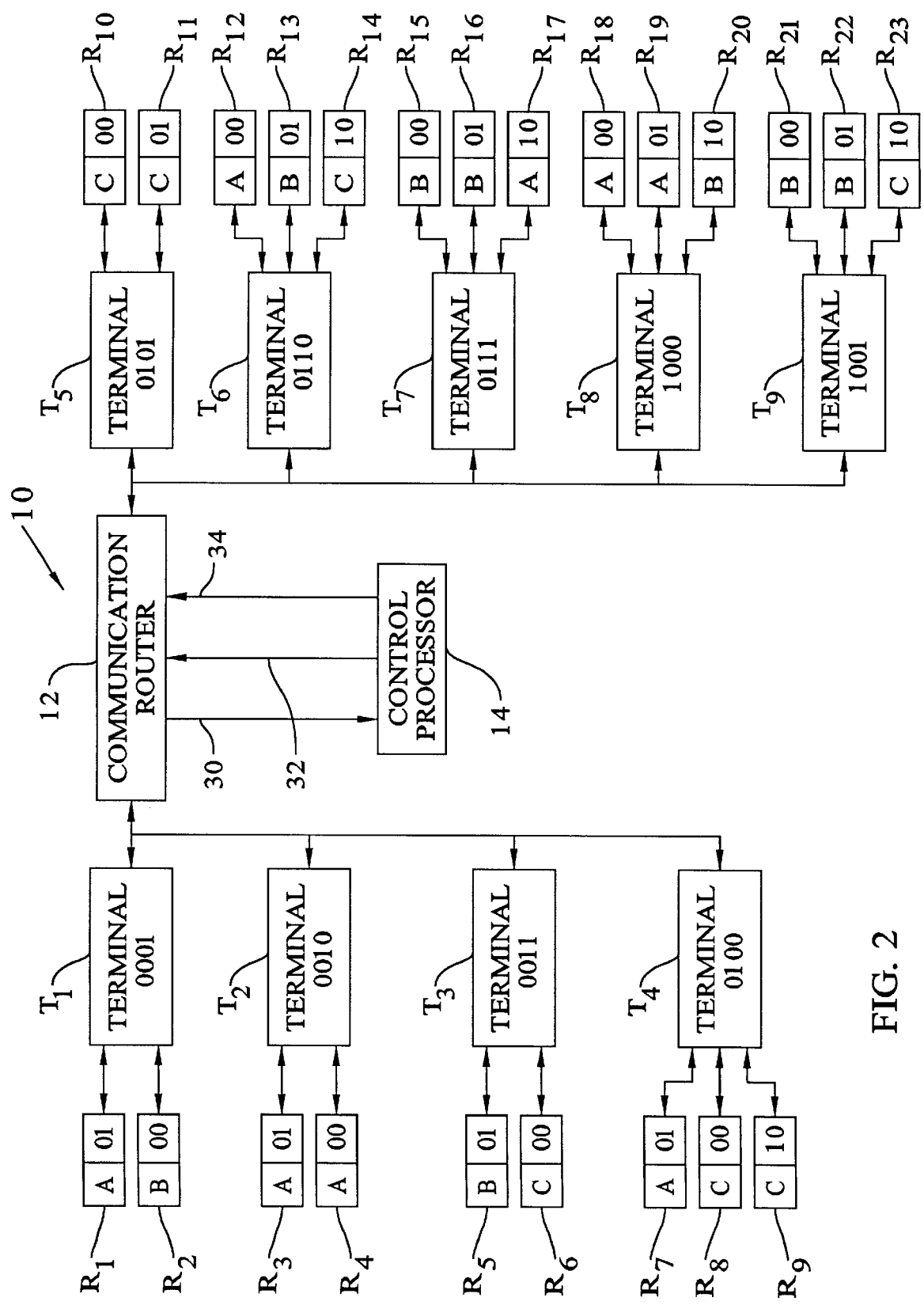
FIG. 2 illustrates a time division multiple access (TDMA) network embodying various features of the present invention.

Referring to FIG. 2, there is shown an example of a TDMA communications network 10 that is comprised of a communication router 12, communications terminals $T_1$ through $T_9$, control processor 14, and communications resources $R_1$ through $R_{23}$. Hereinafter, terminals and resources may be referenced individually or collectively as terminal(s) T and resource(s) R, respectively. The configuration of communications network 10 shown in FIG. 2 is provided by way of example only. It is to be understood that communications network 10 may include any suitable number of terminals T, and any suitable number communications resources R connected to the terminals. Control processor 14 determines appropriate time slots within a time frame in which a message may be transmitted to that by the time it reaches its intended destination(s), the message may be received by designated resources R.

Network 10 includes a network plan which comprises data stored in a memory 70 (FIG. 3) of control processor 14 that may include information such as a sub-address of each resource R connected to a terminal T, configuration data identifying the type of resource (telephone, FAX, computer, etc.), data rate (i.e., for example, 2400 baud), propagation time, time slot assignments, duplex type, and operating channel for each resource and terminal on the network; and a base address for each terminal.

Communications resources R may be as shown for purposes of explaining the invention, to be of three types, A, B, and C, although any number of suitable types of communications resources may be connected to network 10. For example, a Type A resource R may be a telephone; a Type B resource R may be a facsimile (FAX) machine, and a Type C resource R may be a computer. Terminals T are transmitting and receiving stations that may be either full or half duplex stations, depending on the requirements of a particular network. Resources R are operably coupled to particular communications terminals T. Each terminal T has a unique base address and each resource R has a sub-address. The complete address for any resource includes both its associated terminal Tbase address and its sub-address. For example, resource $R_1$ having sub-address 01 is connected to terminal $T_1$ having a base address of 0001. Therefore, the complete address of resource $R_1$ is 000101. Thus, the combination of each sub-address of a resource R and associated base addresses of the terminal T connected to that particular resource collectively provide each resource with a unique address.

In the operation of network 10, messages are communicated between resources R within specific time slots of a periodic time frame divided into some suitable number of time slots. Still referring to FIG. 2, when control processor 14 receives a request message 30, it determines if messages may be sent between particular references R identified in the message request, as for example, from resource $R_3$ to resources $R_{12}$, $R_{17}$, and $R_{19}$. Message requests 30 are generated by the particular resource R from which a message is to be generated. The message requests are transmitted by the corresponding terminal to the communications router 12 and then are directed to the control processor 14. If a message may be sent between the identified "requestor" resources $R_3$ to "requested" resources $R_{12}$, $R_{17}$, and $R_{19}$, the control processor 14 determines the appropriate time slot of slots 1 through m within the present time frame 20 in which to send the message so that it may be received by the intended recipient resources such as, for example, any or all of "target" resources $R_{12}$, $R_{17}$, and $R_{19}$ when the target resources are receptive to receiving the message. The "sending" resource may be referenced as the "requester" resource R. The resources R which are intended to receive the message may be referenced as the "requested" resource(s) R. It is to be noted that in system 10, Type A resources R can only communicate with other Type A resources; Type B resources R can only communicate with other Type B resources; and Type C resources R can only communicate with other Type C resources. For example, Type A resource $R_1$ may be a telephone. Therefore, resource $R_1$ generally cannot communicate with Type B resource $R_5$, such as a FAX machine, or Type C resources $R_8$ and $R_{14}$ which may be computers.

If control processor 14 determines that a communication link cannot be established between particular resources R, control processor 14 generates a "reject" message 32 indicating that a communication link cannot be established. Reject message 32 is provided via communications router 12 to the particular terminal T which initiated the request message 30. If, however, control processor 14 determines that a communications link can be established between resources R of interest, control processor 14 generates a "connect" instruction 34 that is provided via the communications router 12 to the particular terminal T which generated the request message 30. Connect instruction 34 includes identification of the appropriate time slot of the present frame 20 during which the message is to be transmitted from the "requester" resource R and associated terminal T. Communications router 12 is a message relay station and may be implemented, for example, as a communications satellite or as a LAN. Instead of a connect message 34, control processor 14 may generate a "reject" message 32 that is provided to the "requestor" resource R via communications router 12 indicating that no time slot is available during which a message may be transmitted that would be received by one or more of the intended resource R message recipients.

A more detailed description of the operation of control processor 14 is described with reference to FIG. 3. Software routine 50 is implemented in control processor 14. Control processor 14 receives a message request 30 in which is encoded one of a set of resource categories such as resource types A, B, or C, composite addresses comprising both the base address of one or more terminals T and associated sub-addresses of one or more resources R to which a message is to be sent. The requestor resource R may be a facsimile (FAX) machine, telephone, computer, or any other type of device which generates a data signal. In network 10, messages generally may only be sent between resources R of like type, as for example, between telephones, between computers, or between FAX machines. Messages generally cannot be sent between unlike resources R. For example, messages generally cannot be sent between computers and telephones, or between FAX machines and telephones.

At step 60, routine 50 determines the type of resource R that has generated the message request 30 and provides a message type output signal $62_i$ to the corresponding message type processor $64_i$, where i is an index from 1 to N, and N is an integer. A processor $64_1$ determines the type of communications request which is encoded in a message request 30. For example, processor $64_i$ may determine if point-to-point communications is requested in message request 30. An example of a point-to-point request is a request to connect one telephone to another, i.e., a user-to-user request. If such a request is made, then processor $64_i$ performs a simple check to determine whether resources are available to receive a message on a particular communications channel identified in message request 30. Other communication type determinations performed by processor a $64_i$ may include whether message request 30 includes a request for a conference connection whereby multiple resources are connected to a common circuit. Basically, each message type processor $64_i$ comprised of a series of logic conditional statements which are examined to determine the type of communication link encoded in message request 30. An example of one type of logic conditional statement that may be used in a message type processor $64_i$ may be to determine if the baud rate of the resources R to be connected are identical. If the baud rates of all the resources R are identical, the resources R may be connected during a time slot designated for transmitting messages at that particular baud rate. Then the appropriate one of processors $64_i$ generates an output ("OK") signal 66 indicating that a connection may be made between the resources. Each of the processors $64_i$ may have its own unique set of conditionals that need to be satisfied in order for that processor to generate an OK signal 66. If, for example, the baud rates of the resources R at issue are not all identical, then the resources R may not be connected, whereupon the processor $64_i$ generates a REJECT signal 32, indicating that a connection cannot be made between the resources R at issue. It is to be understood that any number of one or more processors $64_i$ may be incorporated into routine 50 in order to suit the requirements of a particular application. Examples of software routines implemented in message type processors $64_i$ are provided, by way of example, in Appendix 1.

Output signal 66 is provided to a time slot processor 68 if a connection or communications link may be established between resources R. Time slot processor 68 determines if a time slot exists in which a message may be injected so that it would be received by all of the intended requested resources R. If a time slot presently exists in which a message may be sent so that it may be received by all of the requested resources R at a time when the requested resources are receptive to receiving the message, then the time slot processor generates a connect instruction 34 that is provided to the requestor resource R through communications router 12. If a time slot does not presently exists in which a message may be sent so that it may be received by all of the requested resources R, then the time slot processor generates queue instruction 36 which is provided as an input to step 60 in the form of a message request 30.

Routine 50 also determines whether a communications link can be established between the resources identified in the message request 30 based on information that is available to each of the message type processors 64, via signal line 35. Routine 50 generates a "reject" message 32 if a communications link cannot be established between the resources R identified in request message 30. Routine 50 generates a "connect" instruction 34 at step 68 if a communications link can be established between the resources R identified in request message 30. The connect message 34 includes a time slot assignment if a time slot is available in which to transmit a message so that by the time it reaches its intended destination, it will be able to be received by the resources R designated for receiving the message once it has been determined that a communications link between the resources identified in message 30 is connectable. Routine 50 also provides the time slot assignment to memory 70 for storage via signal line 72 to update the network plan. Routine 50 also generates a queue message 36 if a communications link can be established at a later time between the resources R identified in request message 30.

A problem arises because the message to be sent requires time to propagate from the requestor resource R to the communication router 12, and then more time to travel from communication router 12 to the requested resource(s) R. Thus, even if a time slot within frame 20 (FIG. 1) is available in which to transmit the message, by the time the message propagates to an intended requested resource, the resource may be busy so that it would not detect the message. Thus, time slot processor 68 is required, inter alia, to identify a time slot in which a message may be sent and to confirm that the message may later be received by the requested resource(s) R is receptive to receiving the message. An example where the requested resource would not be receptive to receiving a message would be if during a particular time slot, the requested resource is scheduled to either receive or transmit some other message. A resource is receptive to receiving a message during a time slot if during that time slot, the resource is not designated to transmit or receive another message.

Figure 3:
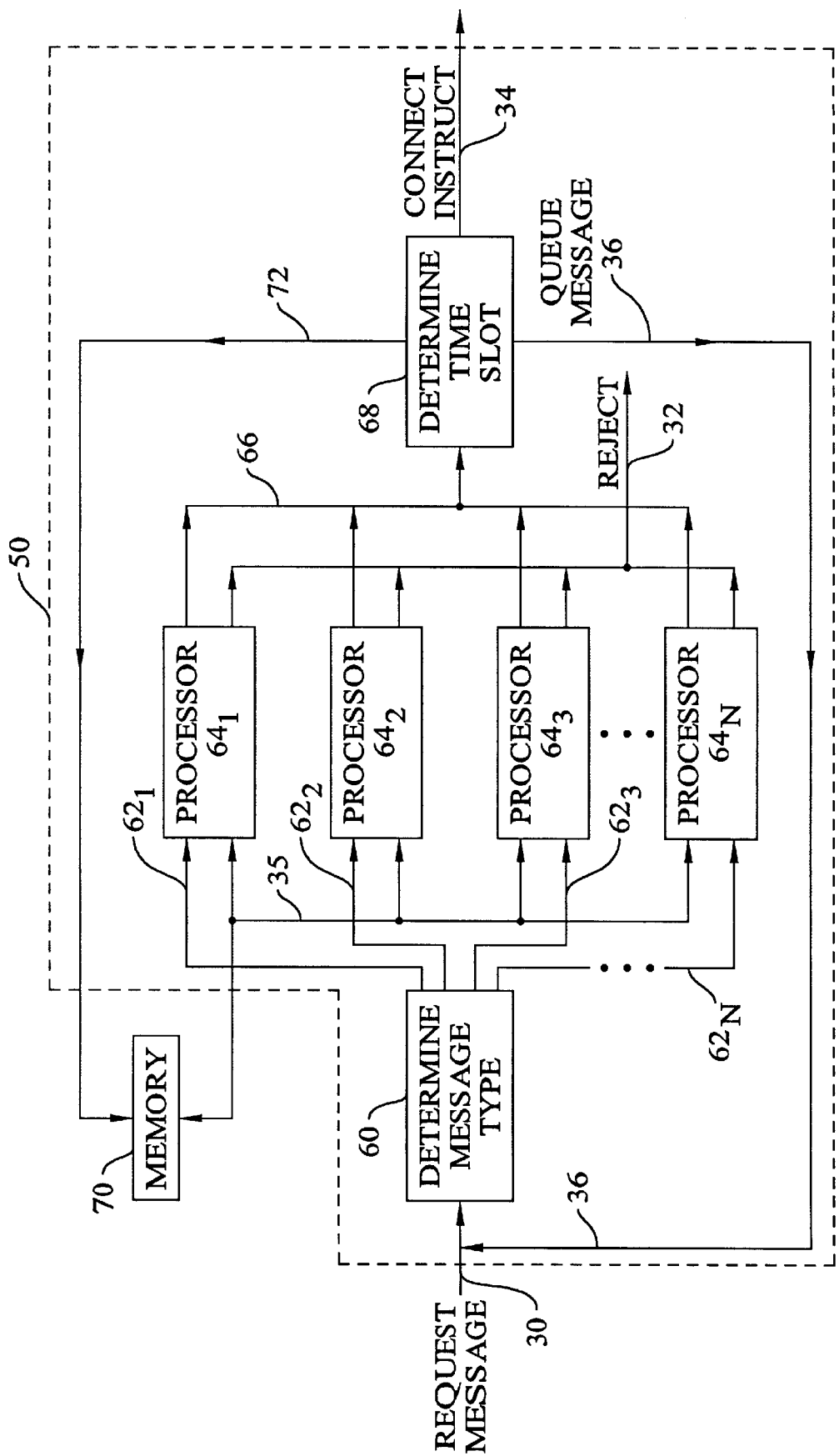
FIG. 3 is a block diagram representing software routines and hardware for determining whether a communication link may be established between multiple resources on the TDMA network of FIG. 1, and for determining if a time slot exists in which the message may be transmitted so that it will reach its intended destinations at time when it may be received by designated resources.

Referring to FIG. 3, processors $64_1$–$64_N$ may predetermine a time slot if a request is made to connect to an existing communications path. Otherwise time slot processor 68 selects an available time slot based upon available time slot assignments stored in memory 70 via signal line 72. The propagation times between each of the resources R on network 10 and router 12 are measured in accordance with well known techniques which determines the time required for a message to propagate from a resource to the communications router 12 and then back to that same resource. Values for each of the propagation times are stored in memory 70 associated with control processor 14 as part of a network plan which includes information about all of the resources on network 10. Such information may include the base address of each terminal T, the sub-address of each resource R, whether a terminal T is a full-duplex or half-duplex terminal, the baud rate of each resource, the number of communications ports on each terminal, and the assignments, if any, for each of the communications ports for particular time slots.

Time slot processor 68 examines the time slots comprising time frame 20A in an iterative process to determine whether a time slot is available in which to transmit the message over the communications link determined to be establishable by one of processors $64_i$ so that the message will be received. If a suitable time slot is identified, then time slot processor generates connect instruction 34 and a time slot value which is provided via signal line 72 for storage in memory 70. If a suitable time slot is not identified, the time slot processor generates queue message 36.

Figure 4B:
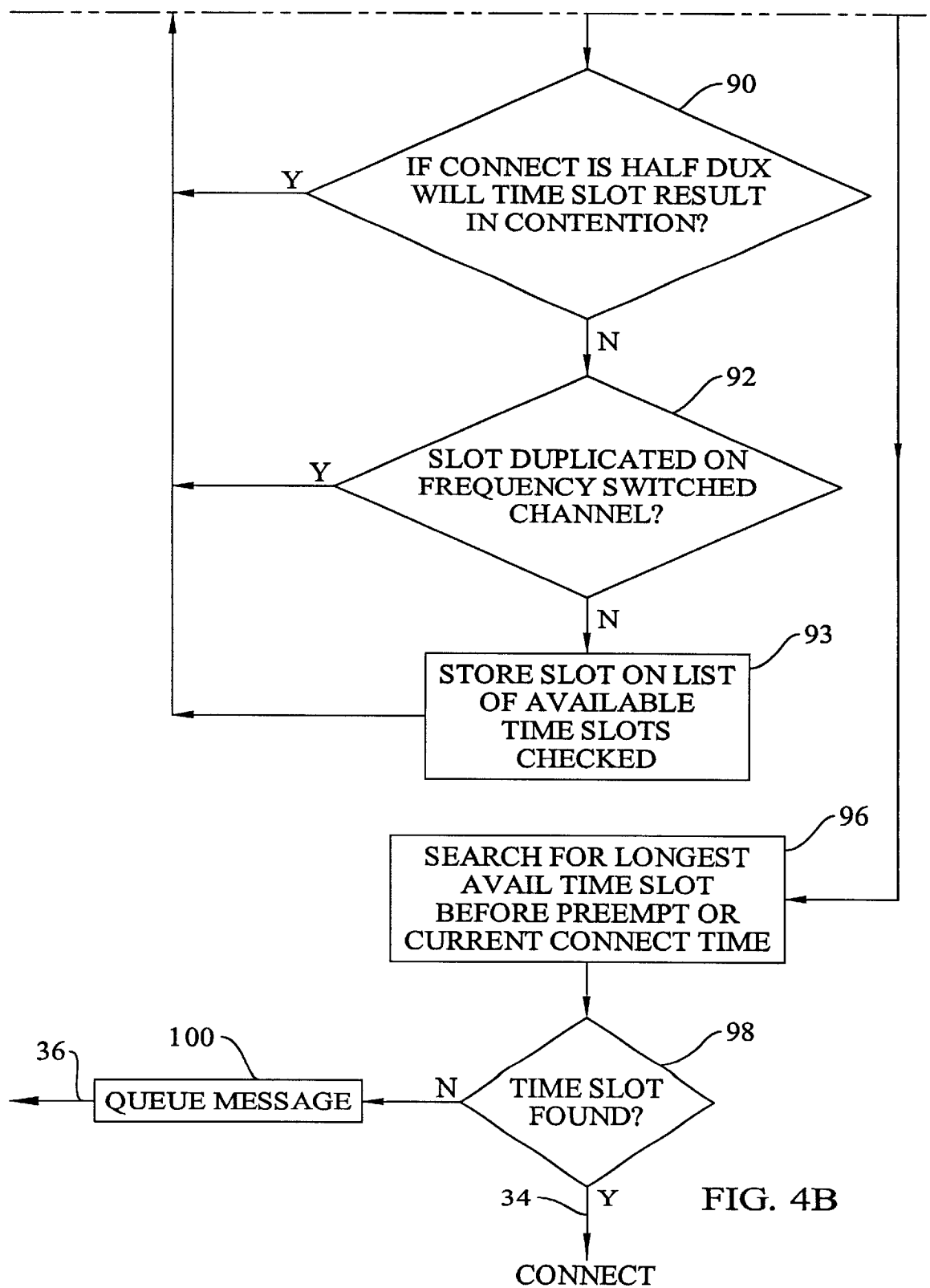
FIG. 4 is a flow chart illustrating computer implemented algorithms for determining an appropriate time slot in which to send a message between multiple resources on the TDMA network of FIG. 2.

A software routine 80 representing the operation of time slot processor 68 is described with reference to FIG. 4. Step 82 determines the duplex status of each terminal T associated with the resources R between the message is to be communicated via data link 72. The duplex status for each terminal T is stored in memory 70. If a time slot is not already predetermined from a processor $64_i$, then step 68 determines the time slot based upon available time slots and the duplex characteristics of the requestor's terminal (contention calculation). If the requestor's and requested's terminals are both full-duplex, then no contention calculation is necessary. If any one user terminal is half duplex, then a contention determination is required. The information used to determine if a contention exists is obtained from a previous user terminal query and stored in memory 70. Next, step 84 determines if a time slot has already been assigned for the present message request 30. If the determination at step 84 is YES, then time slot processor 68 generates a connect instruction 34 at step 86.

If the determination at step 84 is NO, routine 80 proceeds to step 87 where a determination is made as to whether all available time slots have been checked. For example, time frame 20 may consist of 100 time slots, slots 1–100. However, some time slots, for example, such as a time slots 19, 20, and 37 may be designated for conveying messages having certain types of information, such as the characteristics of the resources R on network 10. In such case, time slots 19, 20, and 37 would not be available for transmitting messages. However, time slots 1–18, 21–36, and 38–100 would be available in which to transmit messages. In this example, step 87 would determine if time slots 1–18, 21–36, and 38–100 are available in which to transmit messages so that by the time they are received by requested resources, the requested resources will be receptive to receiving the messages. If the determination at step 87 is NO, routine 80 proceeds to step 88 which determines whether a baud rate match exists between the time slot being examined and all of the resources R to be connected. For example, the time slot being considered may be designated as a 300 baud time slot whereas the resources R to be connected may be 75 baud, 2400 baud or otherwise. If the determination at step 87 is YES, routine 80 continues directly to step 96, described below. If the determination at step 88 is NO, then routine 80 proceeds to step 89, which causes the routine to iterate to the next time slot. If the determination at step 88 is YES, then at step 90 a determination is made as to whether the time slot being examined will result in a "contention."

A contention is a condition where a transmit cycle of a port assignment of a terminal T interferes with the receive cycle of another port assignment of that same terminal T. A transmit cycle is the slot assignment offset by a time $-T_1$ from a reference time by the propagation delay of the communications path of a message to be transmitted between two terminals. A receive cycle is the slot assignment offset by a time $+T_2$ from a reference time by the propagation delay of the communications path of a message to be transmitted between the two terminals. A port assignment is the allocation of a time slot to a resource. Communications are not possible between all resources R identified in a message request 30 if a contention exists between any two of them. Programming code to effectuate step 90 is presented, by way of example, in Appendix 1, incorporated herein by reference.

Figure 5:
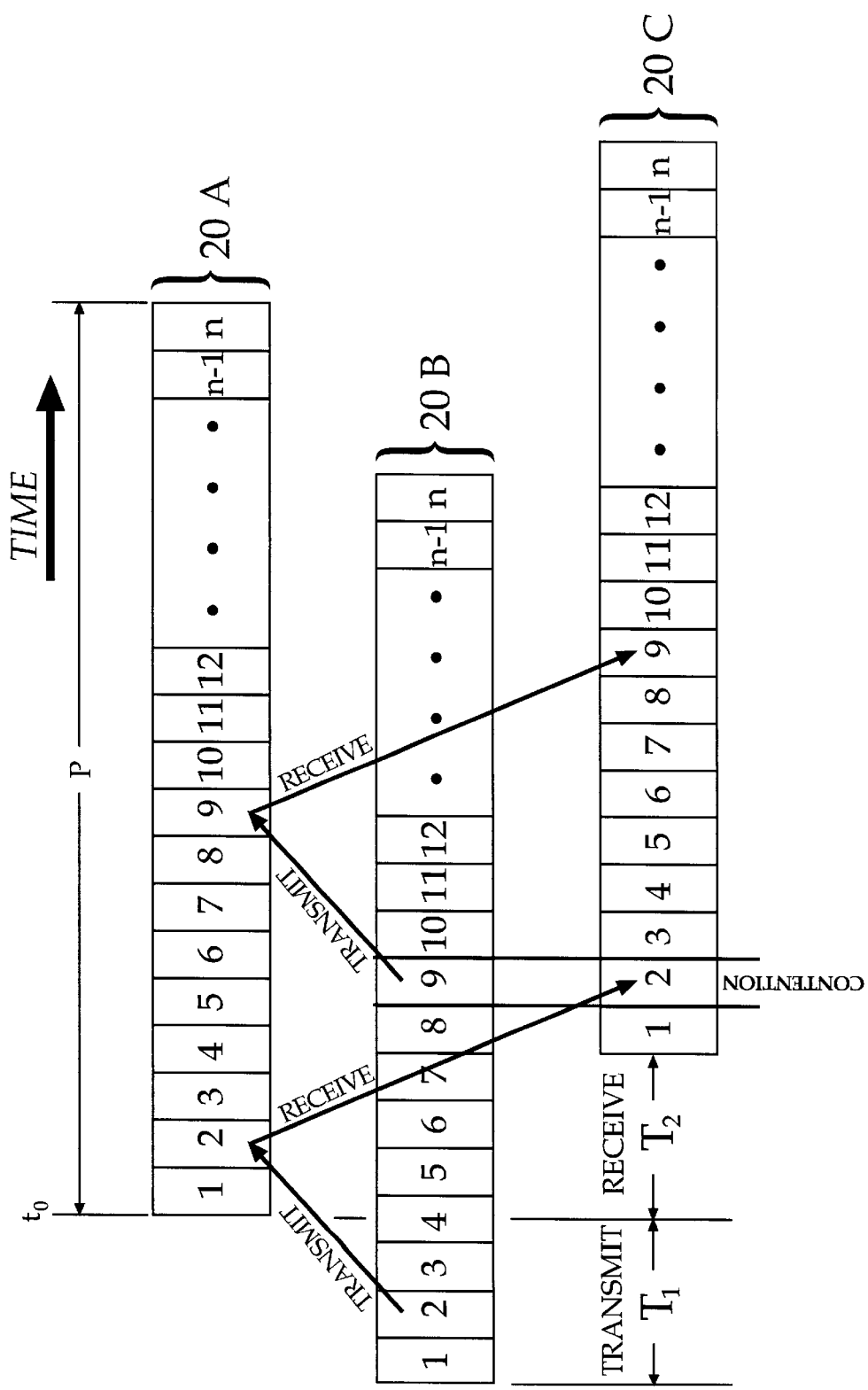
FIG. 5 employs a graphical representation of a periodic time frame divided into time slots with respect to time differences between resources on the TDMA network resulting from propagation time delays of a message.

Determination of assignable or suitable time slot assignments for terminal $T_1$ is described, by way of example, with reference to FIG. 5. Assume that resource $R_2$ has already been assigned time slot 2 for communications either in a receive or transmit mode. Time slot processor 68 searches for an assignable time slot for communicating a message via resource $R_1$. Each assignable time slot for consideration is checked for its transmit and receive cycles having contention with the transmit and receive cycles of previously assigned time slot 2 of terminal $T_1$. In FIG. 5, the transmit cycle of time slot 9 is shown to be in contention with the receive cycle of time slot 2. Therefore, time slot 9 is not assignable for communicating a message via terminal $T_1$. So, time slot processor 68 interates to the next time slot.

If the result of step 90 is that a contention exists, routine 80 proceeds to step 89. If the result of step 90 is that no contention is found with respect to the time slot at issue, routine 80 proceeds to step 92 which determines if a multiport terminal T being examined has another port already assigned to the time slot being examined and to another channel. A multiport terminal T has more than one resource connected to it. For example, terminal $T_1$ is a multiport terminal because it has separate ports, not shown, connected to each of resources $R_1$ and $R_2$. A single port terminal can only have one resource connected to it. By way of example, no single port terminals are shown in FIG. 2, although the scope of the invention includes the use of any number of single port terminals required to meet the requirements of a particular application. If the determination at step 92 is YES, routine 80 continues to step 89. If the determination at step 92 is NO, routine 80 proceeds to step 93.

At step 93 the time slot being examined is placed in a list that is stored in memory 70. If the outcome of step 87 is YES, the routine continues to step 96 which searches for the longest available time slot in which to send a message. The anticipated connection time of a message is provided in message request 30, and this information is conveyed in output signal 64 to time slot processor 68. This step is desirable so that the message is not inadvertently cut-off during the middle of a transmission due to prior allocation of the time slots and resources available on the network 10. Next, step 98 determines if an available time slot has been found. If the determination at step 98 is NO, routine 80 issues queue message 36 at step 100. If the determination at step 98 is YES, connect instruction 34 is issued.

Examples of software programming suitable for implementing software routines 50 and 80 are provided by way of example in Appendix 1, attached. The software programming of Appendix 1 was written in "C." However, it is to be understood that other programming languages may also be used, depending on the requirements of a particular application. Software routines 50 and 80 may generally be stored on computer readable media which include, for example, magnetic floppies, magnetic diskettes, magnetic tapes, optical disks, and the like.

Obviously, many modifications and variations of the present invention are possible in light of the above teachings. It is therefore to be understood that within the scope of the appended claims, the invention may be practiced otherwise than as specifically described.

I claim:

1. A method for determining a message transmission time for establishing a communications link on a time domain multiple access network, comprising the steps of:
   a) receiving a request message at a first communications resource, where said request message has a destination address which identifies a second communications resource;
   b) determining if a communications link is connectable between said first and second communication resources by searching for assignable time slots within a periodic time frame in which to transmit said request message, wherein said second communications resource is not scheduled to receive or transmit a second message during said assignable time slots;
   c) generating a third message if said second communications resource is scheduled to receive or transmit a second message in any of said assignable time slots;
   d) generating a connect instruction to transmit said request message if said second communications resource is not scheduled to receive or transmit said second message in any of said assignable time slots; and
   e) returning to step a if said second communications resource is scheduled to receive or transmit said second message during any of said assignable time slots.

2. A method for determining a message transmission time for establishing a communications link on a time domain multiple access network, comprising the steps of:
   a) receiving a request message having one of a set of communications type categories from a first communications resource, a source address which identifies said first communications resource, and a destination address which identifies a second communications resource;
   b) directing said request message to a message request processor for processing communications requests having said one of a set of communication type categories;
   c) determining if a communications link is connectable between said first and second communication resources;
   d) generating a first message type if said communications link is not connectable between said first and second communication resources;
   e) searching for assignable time slots within a periodic time frame comprising multiple time slots for transmitting said request message so that said second communications resource is receptive to receiving said request message during one of said time slots;
   f) generating a second message type if any of said assignable time slots are identified; and
   g) returning to step a if no assignable time slots are identified, wherein said first message type includes said source and destination addresses, and said assignable time slots.

3. The method of claim 2 wherein said assignable time slots are each represented by a value stored in a memory.

4. The method of claim 2 wherein said step c uses information representing a network plan stored in a memory.

5. The method of claim 2 wherein step e includes determining if said message will arrive at said second resource during a previously assigned time slot.

6. The method of claim 2 wherein said message is transmitted during a first time slot which precedes a reference time by a time factor, $-T_1$, and arrives at said second resource during a second time slot after said reference time by a time factor $+T_1$.

7. A system for determining a message transmission time for establishing a communications link on a time domain multiple access network, comprising:
   a digital computer for implementing the steps of:
      a) receiving a request message at a first communications resource, where said request message has a destination address which identifies a second communications resource;
      b) determining if a communications link is connectable between said first and second communication resources by searching for assignable time slots within a periodic time frame in which to transmit said request message, wherein said second communications resource is not scheduled to receive or transmit a second message during any of said assignable time slots;
      c) generating a third message if said second communications resource is scheduled to receive or transmit a second message in any of said assignable time slots;
      d) generating a connect instruction to transmit said request message if said second communications resource is not scheduled to receive or transmit said second message in any of said assignable time slots; and
      e) returning to step a if said second communications resource is scheduled to receive or transmit said second message during any of said assignable time slots.

8. A time domain multiple access communication network system for determining a time slot within a periodic time frame in which to transmit a message from a first communication resource so that it will be received by a second communication resource, comprising:
   multiple communication resource sets which each include at least one communication resource;
   a communication terminal connected to each communication resource set;
   a communication router operably connected to each communication terminal; and
   a control processor for determining a time slot within a periodic time frame for directing one of said terminals to transmit a request message received from one of said communication resources connected to said one terminal so that said request message will be received by a designated communication resource at a time when said designated communication resource is not scheduled to transmit or receive a second message during said time slot.

9. A time domain multiple access communication network system for determining a time slot within a periodic time frame in which to transmit a message from a first communication resource so that it will be received by a second communication resource, comprising:

multiple communication resource sets which each include at least one communication resource;

a communication terminal connected to each communication resource set;

a communication router operably connected to each communication terminal; and a control processor for determining a time slot within a periodic time frame in which one of said terminals transmits a message received from one of said communication resources connected to said one terminal so that said message will be received by designated communication resources at a time when said designated communication resources are disposed to receive said message, wherein said control processor is programmed to implement the steps of:

a) receiving a request message having one of a set of communications type categories from a first communications resource, a source address which identifies said first communications resource, and a destination address which identifies a second communications resource;

b) directing said request message to a message request processor for processing communications requests having said one of a set of communication type categories;

c) determining if a communications link is connectable between said first and second communication resources;

d) generating a first message type if said communications link is not connectable between said first and second communication resources;

e) searching for assignable time slots within a periodic time frame comprising multiple time slots for transmitting a message so that said second communications resource is receptive to receiving said message during one of said time slots if said communications link is connectable between said first and second communications resources;

f) generating a second message type if any of said assignable time slots are identified in step e; and g) returning to step a if no assignable time slots are identified in step e.

10. A computer program storage device which embodies a program of instructions executable by a computer for establishing a communications link on a time domain multiple access network, said instructions comprising steps for:

a) receiving a request message at a first communications resource, where said request message has a destination address which identifies a second communications resource;

b) determining if a communications link is connectable between said first and second communication resources by searching for assignable time slots within a periodic time frame in which to transmit said request message, wherein said second communications resource is not scheduled to receive or transmit a second message during any of said assignable time slots;

c) generating a third message if said second communications resource is scheduled to receive or transmit a second message in any of said assignable time slots;

d) generating a connect instruction to transmit said request message if said second communications resource is not scheduled to receive or transmit said second message in any of said assignable time slots; and e) returning to step a if said second communications resource is scheduled to receive or transmit said second message during any of said assignable time slots.

* * * * *